United States Patent [19]
Fukai et al.

[11] Patent Number: 5,360,677
[45] Date of Patent: Nov. 1, 1994

[54] MAGNETIC DISK SUBSTRATE

[75] Inventors: Hideaki Fukai; Hiroyoshi Suenaga; Kuninori Minakawa; Shinichiro Otaka; Masahiko Naoe, all of Tokyo, Japan

[73] Assignee: NKK Corporation, Tokyo, Japan

[21] Appl. No.: 4,190

[22] Filed: Jan. 13, 1993

Related U.S. Application Data

[63] Continuation of Ser. No. 480,665, Feb. 15, 1990, abandoned.

[30] Foreign Application Priority Data

Feb. 23, 1989 [JP] Japan .................. 1-44018

[51] Int. Cl.$^5$ .................. G11B 5/66; C22C 14/00
[52] U.S. Cl. .................. 428/694 ST; 428/900; 420/417; 420/420; 420/421
[58] Field of Search .................. 428/694 ST, 900, 65, 428/627, 628, 660; 420/420, 417, 421

[56] References Cited

U.S. PATENT DOCUMENTS

| | | | |
|---|---|---|---|
| 2,766,113 | 10/1956 | Chisholm et al. | 420/421 |
| 3,994,692 | 11/1976 | Rudy | 420/417 |
| 4,783,329 | 11/1988 | Maeland et al. | 420/421 |
| 4,849,205 | 7/1989 | Hong | 420/421 |
| 4,857,269 | 10/1989 | Wang et al. | 420/417 |
| 4,871,400 | 10/1989 | Shindo et al. | 420/417 |
| 4,874,577 | 10/1989 | Wakita et al. | 420/417 |
| 4,886,559 | 12/1989 | Shindo et al. | 420/417 |
| 4,990,362 | 2/1991 | Kibe et al. | 427/38 |
| 5,236,791 | 8/1993 | Yahisa et al. | 428/694 TP |

FOREIGN PATENT DOCUMENTS

| | | |
|---|---|---|
| 168143 | 11/1954 | Australia . |
| 52-105804 | 9/1977 | Japan . |
| 59-151335 | 8/1984 | Japan . |
| 199224 | 9/1986 | Japan . |
| 61-257445 | 4/1987 | Japan . |
| 62-007839 | 6/1987 | Japan . |
| 62-174377 | 1/1988 | Japan . |
| 63-142521 | 6/1988 | Japan . |
| 63-216953 | 9/1988 | Japan . |

OTHER PUBLICATIONS

Patent Abstracts of Japan, vol. 9, No. 2 (P-325), [1725], 8th Jan. 1985, JP-A-59 151 335 (Toshiba K.K.).
Patent Abstracts of Japan, vol. 7, No. 249, (P-234), [1394] 5th Nov. 1983; JP-A-58 133 624 (Suwa Seikosha K.K.) Sep. 8, 1983.
JP 77-74746Y; Magnetic record & replay disc substrate Sep. 5, 1977; Fujitsu ITD; abstract of JP 52-105804.
JP 86-274687/42; Magnetic recording disc; Mar. 1, 1985; Mitsubishi Denki KK; abstract of JP 61-100224.

Primary Examiner—Paul J. Thibodeau
Assistant Examiner—R. Follett
Attorney, Agent, or Firm—Frishauf, Holtz, Goodman & Woodward

[57] ABSTRACT

A magnetic disk substrate having a composition wherein (V/13)+(Fe/20)+(Cr/17)+(Ni/31)+(Co/23) are no greater than 0.010%, Rem+Si+B+W are no greater than 0.015% (where Rem denotes rare earth metals), O+2N+0.75C are no less than 0.03% and no greater than 0.5%, and the remainder consists substantially of Ti, all % being weight %.

4 Claims, 4 Drawing Sheets

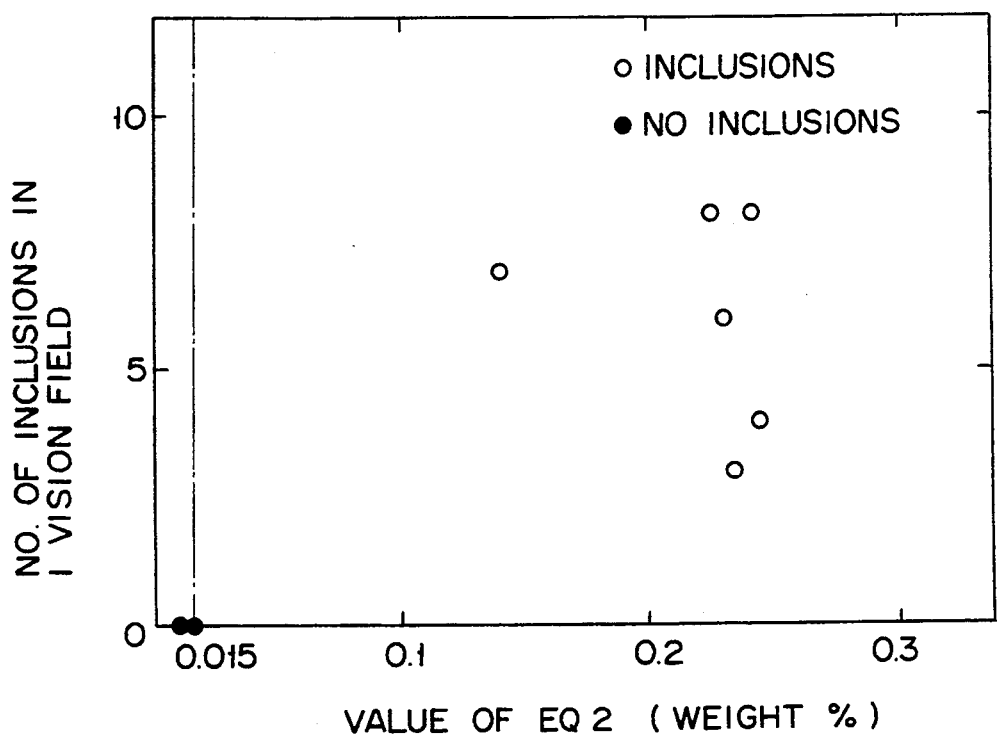
F I G. 1
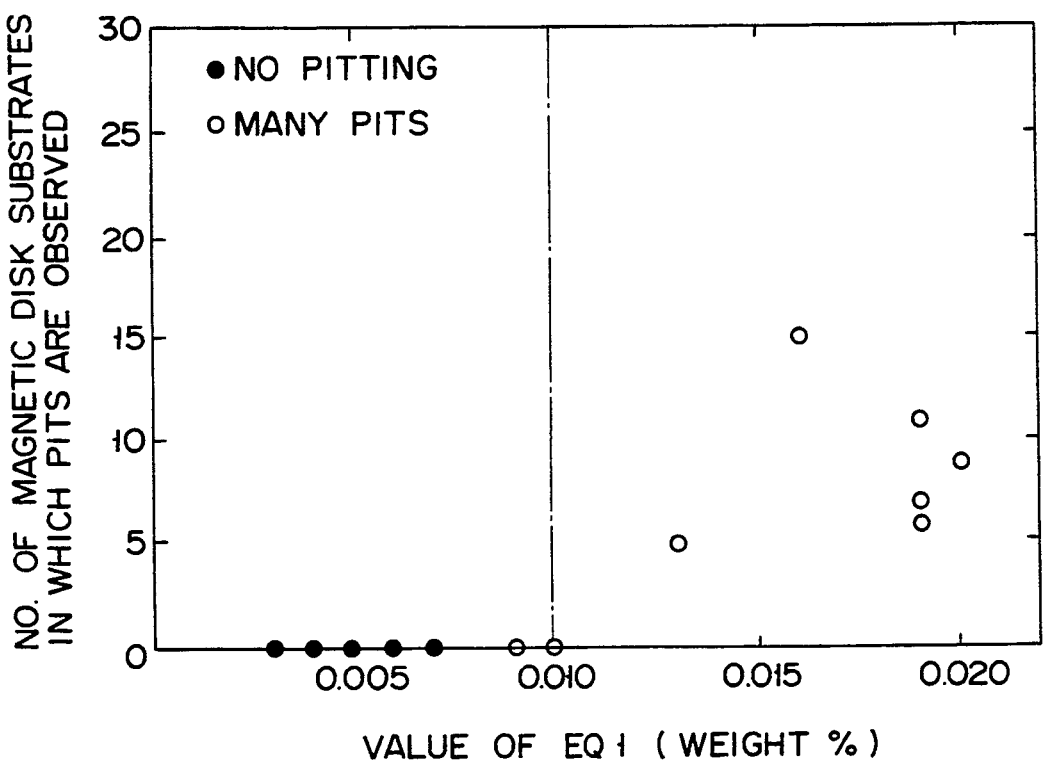
F I G. 2

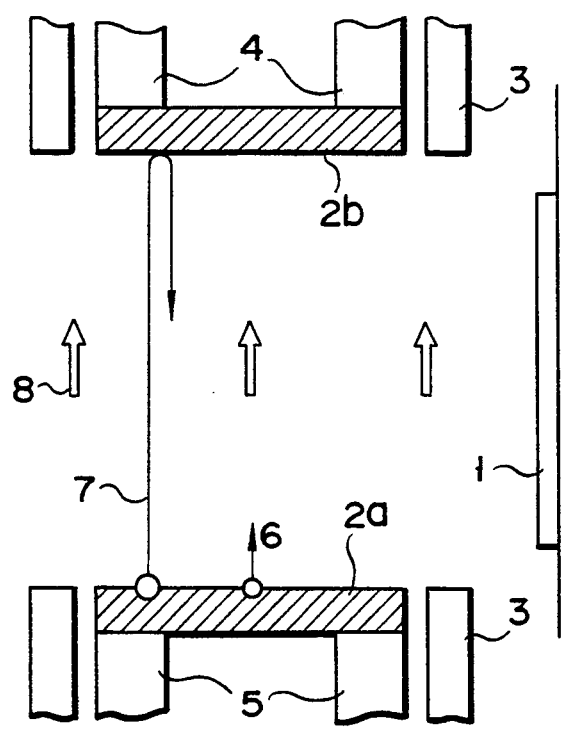
F I G. 3
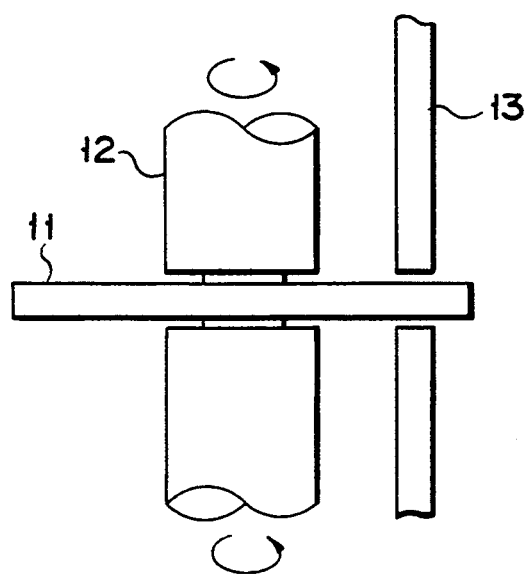
F I G. 4

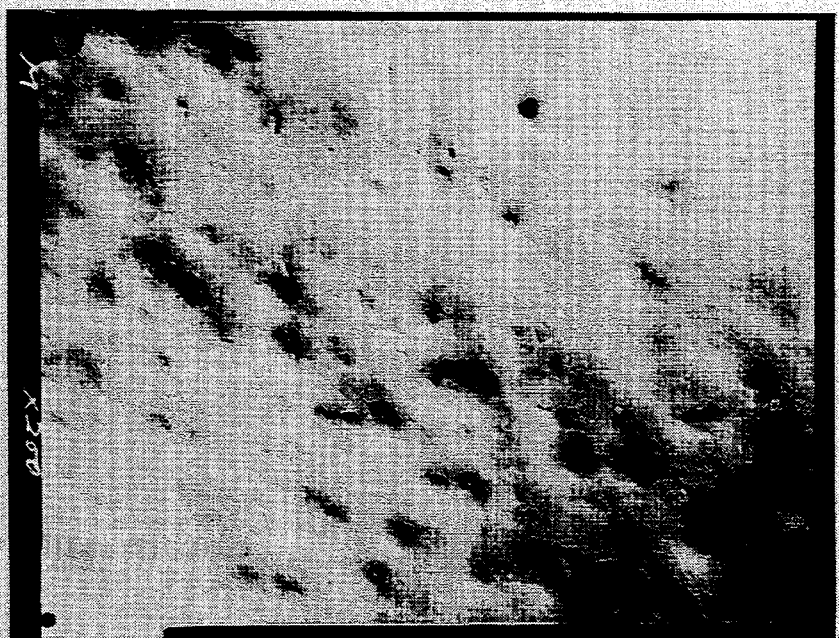
FIG. 7A    x200
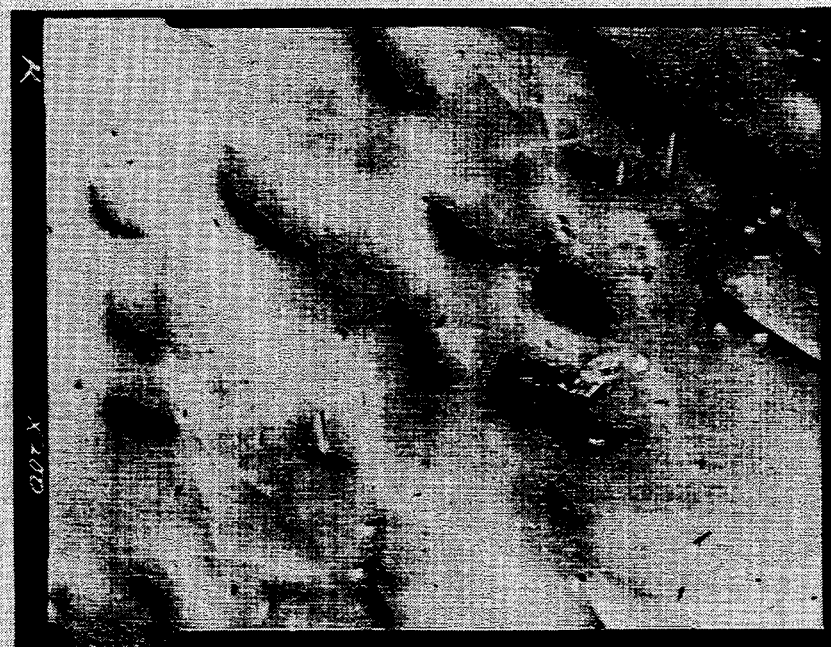
FIG. 7B    x200

MAGNETIC DISK SUBSTRATE

This application is a continuation of application Ser. No. 07/480,665, filed Feb. 15, 1990.

BACKGROUND OF THE INVENTION

1. Field of the Invention

This invention concerns a magnetic disk substrate, and in particular, a magnetic disk substrate with excellent heat resistance which can be made very thin, and which is suitable for the manufacture of magnetic disks of high recording density.

2. Description of the Related Art

Magnetic disk, used as a recording medium for a computer, comprises a substrate and a magnetic film formed on the substrate. The substrate is required to have the following properties:

(a) Its surface properties after precision machining, precision grinding or precision polishing must be satisfactory so that magnetic heads can run smoothly over the disk, and such that stable magnetic properties are obtained with few magnetic errors.

(b) There must be no protuberants or holes in its surface which could lead to defects in the magnetic film formed on the substrate.

(c) It should have sufficient strength and rigidity to withstand high speed rotation when the disk is used, and precision machining during manufacture.

(d) It must be able to withstand the heat applied when forming the magnetic film.

(e) It must be lightweight and non-magnetic.

(f) It must have some degree of corrosion resistance.

Conventionally, Al-Mg or other aluminum alloys are used as substrate materials satisfying these conditions.

Recently, there has been a trend in magnetic disks toward higher recording densities and greater compactness, so the following conditions must also be met:

(A) The magnetic film must have improved magnetic properties, for example it must be possible to form a film with high coercive force.

(B) The magnetic film must be made thinner.

(C) The flying hight of the magnetic heads must be lessened.

(D) The gap length of the magnetic heads must be reduced.

(E) Techniques for positioning the magnetic heads must be improved.

(F) The substrate must be made more compact and thinner.

In order to satisfy these requirements, various provisions are conventionally adopted.

A magnetic film of high recording density is formed by sputtering (Kyuzo Nakamura, "Kinzoku" (Metals), Nov. 1986), or the substrate is made resistant to the heat applied during sputtering.

To lessen the flying hight of the magnetic heads, the aluminum alloy disk is given a Ni-P plating to cover inclusions. In this way, high level surface properties are obtained with little surface roughness and undulations (Masahiro Saito, "Jitsumu Hyomen Gijutsu" (Practical Surface Technology), Vol. 35, No. 6, 1988).

Further, alloy compositions with few inclusions that could lead to electrical and magnetic errors are used for the substrate (Unexamined Published Japanese Patent No. 63-216953, and attempts are made to reduce the thickness of the substrate itself.

To satisfy the above conditions (a)–(f), new materials are constantly being developed to replace aluminum alloys. Examples of these are glass (Hiroyoshi Ishizaki, "Kougyo Zairyo" (Engineering Materials), Vol. 35, No. 5), ceramics (Takeshi Matsumoto, "Jisei Zairyo Kenkyukai" (Magnetic Material Research Group), "Denshi Zairyo Hyomen Shori Gijutsu" (Electronic Material Surface Treatment Technology), July 1987, and titanium (Published Unexamined Japanese Patent Applications Nos. 52-105804, 59-151335 and 63-142521).

Al-Mg or other alloys conventionally used as magnetic disk substrates however have the disadvantage that they do not have sufficient heat resistance to withstand the substrate temperature rise produced by sputtering, which is carried out to form a magnetic film with a high coercive force and low thinness required for high recording density. Further, although the composition of this material was adjusted, it still contained essentially a large quantity of inclusions and high level surface properties could not be obtained. It is therefore impossible to achieve the reduction of the head flying hight required for high recording density, and achieve a sufficient reduction of electrical errors.

To obtain high level surface properties, the surface is plated with Ni-P as described above, but the method has the disadvantage that the plating yield is fairly low. Further, the Ni-P plating tends to crystallize and retain its magnetism at the fairly low temperature of about 350° C., and peel off.

Further, if the aluminum alloy substrate is made thin according to demand, sufficient strength and rigidity cannot be guaranteed to enable it to withstand the high speed disk rotation (for example 3600 rpm) required for a short access time.

Further, if glass or ceramics were used as substrate materials, sufficient heat resistance and strength are obtained, but both materials are brittle and are therefore not very reliable. In the case of glass, moreover, gas discharges occurred due to the high temperature applied for sputtering, and elemental impurities in the glass diffused into the magnetic film, whereby the magnetic properties of the film are adversely affected. Ceramic substrates, on the other hand, contain a large number of pores, and sufficient surface properties cannot be obtained. Glass and ceramics are therefore still unsatisfactory as substrate materials.

As mentioned above, various proposals have been made regarding titanium substrates. In said Published Patent Application No. 52-105804, for example, a magnetic disk substrate is proposed based on titanium or titanium alloy with an oxide or nitride film formed on the surface. This film is formed by oxidizing or nitriding the surface, thereby increasing surface hardness and improving machinability so as to obtain satisfactory surface properties. Further, Published Unexamined Japanese Patent Application No. 59-151335 proposes a magnetic disk substrate of a type titanium alloy containing no less than 80% of hcp phase in terms of volume fraction, and of strength no less than 60 kg/mm².

Further, ordinary pure titanium and a type titanium alloys unavoidably contain $\beta$ stabilizing elements such as Fe and V to the extent of 0.1 weight %. These $\beta$ stabilizing elements easily segregate in the melting, blooming and rolling steps, and easily give rise to pitting due to segregation during polishing. If it is attempted to obtain high level surface properties, therefore, the yield declines. Further, the rate of oxidation and nitriding is different in the $\alpha$ and $\beta$ phases (segregation band), and it is difficult to make oxidizing or nitriding uniformly. The yield of substrates coated with an oxide or nitride film is therefore lower than that of substrates consisting only of titanium, and manufacturing costs are higher. It is stipulated that the total content of elemental impurities in ordinary titanium or a type titanium should not exceed 0.3 weight %. This level of impurities is much lower than that in aluminum alloys, however it is still not sufficiently low to eliminate all the errors due to inclusions, and to obtain high level surface properties.

Further, the magnetic disk substrate disclosed in Published Unexamined Japanese Patent Application No. 63-142521 comprises a core layer of titanium or titanium alloy, an insert layer, a layer of nickel, titanium, nickel alloy or titanium alloy, and a layer of glass or ceramics superimposed on one another in that order. As the number of processes required to manufacture such a substrate is greater than in the case of titanium alone, however, manufacturing costs are high and manufacturing time is also lengthy. Further, if ceramics is used for the outermost layer, adequate surface properties cannot be obtained since ceramics contain a large number of pores. If glass is used, the surface roughness Ra (explained later) can be kept to the very low level of approx. 0.005 μm, but this solution is undesirable as the heads tend to stick to the glass surface.

At present, therefore, a satisfactory magnetic disk substrate cannot be obtained even if titanium is used as the principal material.

SUMMARY OF THE INVENTION

The present invention is designed to overcome the above problems. It is an object of the present invention to provide a magnetic disk substrate with excellent heat resistance that can be manufactured in very small thicknesses, is free from inclusions or pitting that are responsible for magnetic errors, can be manufactured in high yield, and has high level surface properties.

According to the present invention, there is provided a magnetic disk substrate having a composition wherein (V/13)+(Fe/20)+(Cr/17)+(Ni/31)+(Co/23) are no greater than 0.010%, Rem+Si+B+W are no greater than 0.015% (where Rem denotes rare earth metals), O+2N+0.75C are no less than 0.03% and no greater than 0.5%, and the remainder consists essentially of Ti.

BRIEF DESCRIPTION OF THE DRAWINGS

FIG. 1 is a graph of the relation between the value of EQ 2 and the number of inclusions in the disk substrate;

FIG. 2 is a graph of the relation between the value of EQ 1 and the occurrence of pitting in the disk substrate;

FIG. 3 is a schematic drawing of the structure of the sputtering device used to form the magnetic film on the disk substrate;

FIG. 4 is a schematic drawing of a device used to rotate the substrate at high speed and measure displacements in the vertical direction;

FIGS. 7A and 7B are photographic magnifications of the substrate surface;

DETAILED DESCRIPTION OF THE PREFERRED EMBODIMENTS

Figure 5:
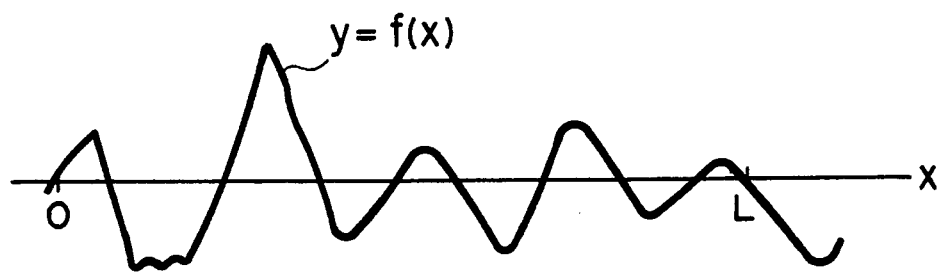
FIG. 5 is a drawing describing the calculation of Ra of the substrate surface.

As a result of various studies, the inventors of the present invention discovered that the heat resistance and the strength of the magnetic disk substrate depend on the matrix and composition of the matrix, and also that the occurrence of inclusions and pitting which lead to magnetic errors or deterioration of surface properties depends mainly on the component and composition of the substrate material. They thus found that, using Ti as the matrix of the substrate material, controlling gaseous components in the Ti, and strictly limiting inclusions and elements which interfere with phase stabilization, it was possible to provide a magnetic disk substrate with excellent heat resistance that can be manufactured in small thicknesses, is substantially free from inclusions and pitting responsible for magnetic errors, and also has satisfactory surface properties.

From the above considerations, this invention provides a magnetic disk substrate having a composition wherein (V/13)+(Fe/20)+(Cr/17)+(Ni/31)+(Co/23) are no greater than 0.010%, Rem+Si+B+W are no greater than 0.015% (where Rem denotes Sc, Y, La, Ce, Pr, Nd, Pm, Eu, Gd, Tb, Dy and Lu), O+2N+0.75C are no less than 0.03% and no greater than 0.5%, and the remainder consists substantially of Ti, these percentages referring to weight % (which will be referred to hereafter simply as %). V, Fe, Cr, Ni and Co in the above equation refers to wt % of the identified elements.

The surface properties of the magnetic disk substrate also depend on the grain size, and to obtain even better surface properties, it is preferable that the average grain size of the materials in the above composition is no greater than 30 μm.

We shall now describe this invention in more detail.

In what follows, the expression (V/13)+(Fe/20)+(Cr/17)+(Ni/31)+(Co/23) will be referred to as EQ 1, the expression Rem+Si+B+W as EQ 2, and O+2N +0.75C as EQ 3 for the purpose of simplification.

The melting point of titanium is as high as about 1650° C. If titanium is used as the magnetic disk substrate material, therefore, the substrate can be given satisfactory heat resistance, and it does not deform even at 300°–400° C. which is the temperature at which sputtering is performed to form the magnetic film. Further, the tensile strength of titanium is approximately 30 kgf/mm$^2$, its modulus of longitudinal elasticity is approximately 10000 kgf/mm$^2$, and its strength and rigidity are high. Even if it is thin, therefore, it can fully withstand the centrifugal force produced by high rotation speeds of 3600 rpm or over. Further, when the substrate made only of titanium, it can easily be manufactured in small thicknesses, and there is no peeling at inter-layer interfaces such as occurs in Ni-P plated Al alloy substrates. It is therefore preferable to use titanium as the substrate material.

O, N and C may be dissolved in the titanium matrix as solid solutions, and substrate strength is improved by a solid-solution hardening. These elements are therefore effective in permitting the thickness of the titanium substrate to be made smaller. Although these elements improve strength, however, they also impair workability, and have an adverse effect on yield in manufacture of blanks before the mirror finish. The quantities of O, N and C added are therefore limited to within a specific range.

The elements V, Fe, Cr, Ni and Co in the titanium stabilize the $\beta$ phase, which has a stable hcp structure at high temperature. If these elements exceed a certain level in the titanium matrix of the magnetic disk substrate, however, they become concentrated and segregate in high temperature steps such as melting, blooming and rolling. This concentration and segregation carries over to the circular disk blanks before the mirror finish. If blanks wherein $\beta$ stabilizing elements have concentrated and segregated are polished and ground in order to form a mirror surface, the areas where such concentration and segregation has taken place will have different properties to those of the matrix, and pitting will occur. $\beta$ stabilizing elements such as V, Fe, Cr, Ni and Co in the Ti matrix must therefore be limited to minute proportions.

If rare earth elements, Si, B and W in the titanium matrix exceed a certain concentration, they combine with O and N which exist as solid solution elements in the titanium matrix so as to form oxides or nitrides, or with titanium so as to form intermetallic compounds, and thereby lead to the appearance of inclusions. The quantities of rare earth elements, Si, B and W are therefore reduced so as to inhibit the occurrence of inclusions.

In this way, in this invention, the use of titanium for the matrix of the substrate material increases heat resistance, and makes it possible to manufacture the substrate in smaller thicknesses, while at the same time the component and the composition are limited so as to improve other properties. More specifically, the quantities of elements such as V, Fe, Cr, Ni and Co that stabilize the $\beta$ phase which is different from the a phase of the matrix, and the quantities of rare earth elements, Si, B and W which lead to inclusions in the titanium, are limited as far as possible, while the addition of O, N and C which exist as solid solution elements in the titanium matrix and thereby improve the strength of the substrate, is kept to within specified proportions.

This magnetic disk substrate thus makes it possible to achieve excellent heat resistance, manufacture a disk of smaller thickness, eliminate inclusions and pitting responsible for magnetic errors, and achieve high level surface properties with high yield.

The substrate material is a polycrystalline material, and the crystals on its surface have various orientations. In the mirror finish step, therefore, the speed of precision polishing and precision grinding is different depending on the crystal orientation, and differences in level occur among the crystals. The finer the grain size, the smaller the difference in the orientations of neighboring grains and the smaller the differences in level. From the viewpoint of satisfactory surface properties of the substrate, therefore, it is preferable to make the grain size small.

Conventionally, in cold rolling sheet of the a type titanium alloy, the grain size was about 50 $\mu$m on average, but better substrate surface properties can be obtained by making the average no greater than 30 $\mu$m. More specifically, if the average grain size is greater than 30 $\mu$m, the difference in level assumes the relatively large value of 0.4 $\mu$m–0.8 $\mu$m, but by making the grain size no greater than 30 $\mu$m, the difference in level can be made less than 0.4 $\mu$m and very satisfactory surface properties can be obtained.

To make the average grain size of the titanium substrate no greater than 30 $\mu$m, the draft in cold rolling, and the temperature and time in heat treatment, may be suitably controlled.

We shall next describe in detail the reasons for applying specific limits to the quantities of the above constituents in the substrate composition.

1. O, N, and C

As mentioned above, O, N and C form solid solutions in the titanium matrix, and have the function of strengthening the matrix. If O, N and C are incorporated in the matrix independently, the desired strength is not obtained if their quantities are less than 0.03%, 0.015% and 0.04% respectively. It is therefore preferable that their quantities are respectively O$\geq$0.03%, N$\geq$0.015% and C$\geq$0.04%. If on the other hand the quantities of these elements are excessive, workability declines. More specifically, if O, N and C exceed 0.5%, 0.25% and 0.67% respectively, cold workability decreases, and it is therefore preferable that O$\leq$0.5%, N$\leq$0.25% and C$\leq$0.67%. As these elements all have a similar action, it is however necessary to specify their total quantity. Further, their effect is in the proportion O : N : C = 1 : 2 : 0.75. The total quantity of O, N and C is therefore specified by the condition that 0.03% $\leq$EQ 3$\leq$0.5%.

2. V, Fe, Cr, Ni and Co

As mentioned above, V, Fe, Cr, Ni and Co are $\beta$ stabilizing elements in the titanium matrix, and they easily segregate in the melting, blooming and rolling steps up to the manufacture of the cold-rolled sheet. If these elements should segregate, therefore, pitting occurs easily in the polishing process required to manufacture the magnetic disk substrate, and satisfactory surface properties cannot be obtained. More specifically, pitting occurs if the concentration of V exceeds 0.13%, that of Fe exceeds 0.20%, that of Cr exceeds 0.17%, that of Ni exceeds 0.31% and that of Co exceeds 0.23%. It is therefore preferable that V$\leq$0.13%, Fe$\leq$0.20%, Cr$\leq$0.17%, Ni$\leq$0.31% and Co$\leq$0.23%. As these elements all have a similar effect, however, it is necessary to specify their total quantity. Their effect is in the proportion V:Fe:Cr:Ni:Co = 1/13:1/20:1/17:1/31:1/23. The total quantity of these constituents is therefore specified by the condition: EQ 1$\leq$0.01%.

3. Rem, Si, B and W

As mentioned above, Rem, Si and B react with the oxygen and nitrogen dissolved in the titanium matrix to form oxides and nitrides, and form intermetallic compounds with titanium, so as to lead to inclusions. It is therefore preferable that the quantity of these elements is no greater than 0.015%, but as they all have a similar effect it is necessary to specify their total quantity. The total quantity of these constituents is, therefore, specified by the condition: EQ 2$\leq$0.015%. As mentioned earlier, moreover, the term Rem denotes the rare earth metals Sc, Y, La, Ce, Pt, Nd, Pm, Eu, Gd, Tb, Dy and Lu.

EXAMPLES

We shall now explain some specific examples of this invention.

EXAMPLE 1

11–24 in Table 1B are comparative examples outside the compositional range of this invention.

TABLE 1A

| Composition No. | V | Fe | Cr | Ni | Co | EQ(1) | Rem | Si | B | W | EQ(2) | O | N | C | EQ (3) | Remainder |
|---|---|---|---|---|---|---|---|---|---|---|---|---|---|---|---|---|
| Example 1 | 0.01 | 0.02 | 0.01 | ND | 0.01 | 0.003 | Y 0.002 | 0.010 | 0.001 | 0.001 | 0.014 | 0.08 | 0.015 | 0.04 | 0.14 | Ti |
| 2 | 0.09 | 0.03 | 0.01 | 0.01 | 0.01 | 0.009 | Y + Sc 0.003 | 0.009 | 0.001 | 0.001 | 0.014 | 0.06 | 0.016 | 0.04 | 0.122 | " |
| 3 | 0.01 | 0.15 | ND | 0.01 | 0.01 | 0.009 | Y + Sc 0.003 | 0.008 | 0.001 | 0.001 | 0.013 | 0.05 | 0.019 | 0.05 | 0.126 | " |
| 4 | 0.01 | 0.03 | 0.13 | 0.01 | 0.01 | 0.009 | Y + Sc 0.003 | 0.009 | 0.001 | 0.001 | 0.014 | 0.08 | 0.018 | 0.04 | 0.146 | " |
| 5 | 0.01 | 0.03 | 0.01 | 0.11 | 0.01 | 0.007 | Y 0.002 | 0.010 | 0.001 | ND | 0.013 | 0.09 | 0.017 | 0.04 | 0.154 | " |
| 6 | 0.01 | 0.03 | 0.01 | 0.21 | 0.01 | 0.010 | ND | 0.008 | 0.001 | 0.001 | 0.010 | 0.07 | 0.015 | 0.04 | 0.130 | " |
| 7 | 0.01 | 0.03 | 0.01 | 0.01 | 0.07 | 0.006 | Y + Sc 0.003 | 0.010 | 0.001 | 0.001 | 0.015 | 0.09 | 0.015 | 0.07 | 0.173 | " |
| 8 | 0.01 | 0.03 | 0.01 | 0.01 | 0.17 | 0.010 | Y 0.002 | 0.011 | ND | 0.001 | 0.014 | 0.09 | 0.017 | 0.06 | 0.169 | " |
| 9 | 0.01 | 0.04 | 0.01 | 0.01 | ND | 0.004 | Y + Sc 0.003 | 0.009 | 0.001 | 0.001 | 0.014 | 0.33 | 0.015 | 0.04 | 0.39 | " |
| 10 | ND | 0.04 | 0.01 | 0.01 | 0.01 | 0.003 | Y + Sc 0.003 | 0.009 | 0.001 | 0.001 | 0.014 | 0.40 | 0.018 | 0.04 | 0.466 | " |

TABLE 1B

| Composition No. | V | Fe | Cr | Ni | Co | EQ (1) | Rem | Si | B | W | EQ(2) | O | N | C | EQ (3) | Remainder |
|---|---|---|---|---|---|---|---|---|---|---|---|---|---|---|---|---|
| Example 11 | 0.14 | 0.02 | 0.01 | 0.01 | 0.01 | 0.013 | Y 0.002 | 0.010 | 0.001 | 0.001 | 0.014 | 0.08 | 0.019 | 0.05 | 0.156 | Ti |
| 12 | 0.01 | 0.35 | 0.01 | 0.01 | ND | 0.019 | Y + Sc 0.003 | 0.009 | 0.001 | 0.001 | 0.014 | 0.06 | 0.020 | 0.05 | 0.138 | " |
| 13 | ND | 0.03 | 0.29 | 0.01 | 0.01 | 0.019 | Y + Sc 0.003 | 0.008 | 0.001 | 0.001 | 0.013 | 0.05 | 0.015 | 0.10 | 0.155 | " |
| 14 | 0.01 | 0.03 | ND | 0.50 | 0.01 | 0.019 | Y + Sc 0.003 | 0.009 | 0.001 | 0.001 | 0.014 | 0.08 | 0.019 | 0.54 | 0.156 | " |
| 15 | 0.01 | 0.02 | 0.01 | 0.01 | 0.39 | 0.020 | Y 0.002 | 0.010 | 0.001 | 0.001 | 0.014 | 0.09 | 0.015 | 0.07 | 0.173 | " |
| 16 | 0.01 | 0.05 | 0.06 | 0.07 | 0.05 | 0.011 | Y 0.002 | 0.011 | 0.001 | 0.001 | 0.015 | 0.09 | 0.019 | 0.07 | 0.181 | " |
| 17 | 0.01 | 0.03 | 0.01 | 0.01 | 0.01 | 0.004 | Y + Sc + La 0.231 | 0.008 | 0.001 | ND | 0.240 | 0.05 | 0.017 | 0.05 | 0.122 | " |
| 18 | 0.01 | 0.03 | 0.01 | 0.01 | 0.01 | 0.004 | Y + Sc 0.003 | 0.220 | 0.001 | 0.001 | 0.225 | 0.03 | 0.019 | 0.05 | 0.106 | " |
| 19 | 0.01 | 0.05 | 0.01 | 0.01 | 0.01 | 0.005 | ND | 0.012 | 0.220 | 0.001 | 0.233 | 0.06 | 0.021 | 0.04 | 0.132 | " |
| 20 | 0.01 | 0.05 | 0.01 | 0.01 | 0.01 | 0.005 | Y + Sc 0.003 | 0.010 | ND | 0.230 | 0.244 | 0.07 | 0.017 | 0.04 | 0.134 | " |
| 21 | 0.01 | 0.05 | 0.01 | 0.01 | 0.01 | 0.005 | Y + Sc 0.070 | 0.070 | 0.050 | 0.040 | 0.230 | 0.08 | 0.018 | 0.04 | 0.146 | " |
| 22 | 0.01 | 0.03 | 0.01 | 0.01 | 0.01 | 0.004 | Y + Sc 0.060 | 0.080 | ND | ND | 0.140 | 0.07 | 0.018 | 0.04 | 0.130 | " |
| 23 | 0.01 | 0.04 | 0.01 | 0.01 | 0.01 | 0.004 | Y 0.002 | 0.011 | 0.001 | 0.001 | 0.015 | 0.005 | 0.009 | 0.005 | 0.027 | " |
| 24 | 0.01 | 0.03 | 0.01 | 0.01 | 0.01 | 0.004 | Y 0.002 | 0.011 | 0.001 | 0.001 | 0.015 | 0.53 | 0.011 | 0.005 | 0.556 | " |

Experimental Conditions

Ingots having the compositions shown in Tables 1A and 1B (composition numbers 1–24) were manufactured by VAR melting, and break down at 1000° C. to form slabs of thickness 20 nun. Final hot rolling was performed on the slabs at 870° C. so as to obtain a hot-rolled sheet of thickness 6 mm. The oxide film on this hot-rolled sheet was removed, the sheet was machine-cut into a plate of thickness of 5 mm, and cold rolling was then performed on the plate so as to obtain a cold-rolled plate of thickness 1.5 mm. This cold-rolled plate was annealed at 650° C. for 1 hour.

Composition nos. 1–10 in Table 1A are within the compositional range of this invention; composition nos.

Further, as conventional examples, cold-rolled plates were also prepared with the compositions shown in Table 2 (composition nos. 25–28). Of these, the cold-rolled plate of composition 25 was manufactured by crucible melting of Al alloy 5086 for use in magnetic disk substrates, forgoing, annealing at 500° C. for 8 hours, final hot rolling at 470° C. to give a plate of thickness of 5 mm, and cold rolling to give a cold-rolled plate of thickness 1.5 mm. The cold-rolled plates of compositions 26, 27 and 28 were manufactured from ingots by VAR melting of CP-2 Ti (CP: JIS (Japanese Industrial Standard) Classification), CP-4 Ti and Ti-6Al-4V alloy respectively, forging at 1000° C. to form slabs of thickness 20 mm, final hot rolling of the slabs at 870° C. for CP-2 Ti and CP-4 Ti, and at 950° C. for Ti-6Al-V alloy, to form a hot-rolled sheet of thickness 6 mm, removal of the oxide film, machine cutting of the sheet to give a plate of thickness 5 mm, and cold rolling to give a cold-rolled plate of thickness 1.5 mm.

In Table 3, compositions 25–28 correspond to CP-2 Ti, CP-4 Ti and Ti-6Al-4V alloy.

finally given an alumina finishing polish so as to produce magnetic disk substrates of thickness 1.27 mm. 50 magnetic disk substrates were prepared from each of the above compositions. The surfaces of these magnetic disk substrates were observed by a differential interfer-

TABLE 2

| Composition No. | Composition (weight %) | | | | | | | | | | |
|---|---|---|---|---|---|---|---|---|---|---|---|
| | V | Fe | Cr | Ni | Co | EQ(1) | Rem | Si | B | W | EQ(2) |
| Conventional | 25 | — | 0.08 | — | — | — | — | 0.03 | — | — | — | — |
| Example | 26 | 0.04 | 0.09 | 0.03 | 0.02 | 0.04 | 0.012 | 0.002 | 0.010 | — | — | 0.012 |
| | 27 | 0.05 | 0.22 | 0.03 | 0.02 | 0.04 | 0.019 | 0.002 | 0.011 | — | 0.001 | 0.014 |
| | 28 | 4.40 | 0.28 | 0.03 | 0.02 | 0.04 | | 0.003 | 0.010 | 0.001 | 0.001 | |

| Composition No. | Composition (weight %) | | | | | | | | | | |
|---|---|---|---|---|---|---|---|---|---|---|---|
| | O | N | C | EQ(3) | H | Cu | Mn | Mg | Zn | Al | Ti |
| Conventional | 25 | — | — | — | — | — | 0.02 | 0.21 | 4.2 | 0.02 | Remainder | 0.01 |
| Example | 26 | 0.10 | 0.008 | 0.004 | 0.119 | 0.001 | — | 0.001 | 0.002 | — | 0.001 | Remainder |
| | 27 | 0.25 | 0.010 | 0.01 | 0.283 | 0.001 | — | 0.001 | 0.002 | — | 0.001 | " |
| | 28 | 0.13 | 0.004 | 0.016 | | 0.001 | — | 0.003 | 0.002 | — | 6.01 | " |

TABLE 3

| Specification | Composition (weight %) | | | | | | | | | | | | | | | Other impurities | |
|---|---|---|---|---|---|---|---|---|---|---|---|---|---|---|---|---|---|
| | Fe | O | C | N | H | Y | Al | V | Si | Cu | Mn | Mg | Cr | Zn | Ti | Individual | Total |
| 5086 Al alloy | max. 0.50 | — | — | — | — | — | Remainder | — | max. 0.40 | max. 0.10 | 0.20~ 0.70 | 3.5~ 4.5 | 0.05~ 0.25 | max. 0.25 | max. 0.15 | max. 0.05 | max. 0.15 |
| CP-2 type Ti | max. 0.25 | max. 0.20 | max. 0.08 | max. 0.05 | max. 0.015 | — | — | — | — | — | — | — | — | — | Remainder | max. 0.10 | max. 0.3 |
| CP-4 type Ti | max. 0.50 | max. 0.40 | max. 0.08 | max. 0.05 | max. 0.015 | — | — | — | — | — | — | — | — | — | Remainder | max. 0.10 | max. 0.3 |
| Ti-6Al-4V alloy | max. 0.30 | max. 0.20 | max. 0.08 | max. 0.05 | max. 0.0125 | max. 0.005 | 5.50~ 6.75 | 3.50~ 4.50 | — | — | — | — | — | — | Remainder | max. 0.10 | max. 0.4 |

The mechanical properties (tensile strength, yield strength and elongation) of the cold-rolled plates of thickness 1.5 mm and compositions 1–28 were measured, and each plate was observed with an optical microscope at a magnification of 400x, 60 fields respectively, to investigate the number of inclusions. Further, the presence or absence of cracks of 1 mm or longer produced when the plates were cold rolled from a thickness of 5 mm to 1.5 mm was also observed with the naked eye.

Circular plates (disks) of outer diameter 95 mm and inner diameter 25 mm were then punched out from the cold-rolled plates. Thermal flattening was performed on the Ti system disks at 500° C. for 6 hours, and on the Al system disks at 300° C. for 6 hours. The surfaces of the disks were ground by #400, #800, #1500 and #4000 grindstones in that order (#: JIS Mesh Number), and ence microscope at a magnification of 100x, 60 fields respectively, to investigate the presence or absence of pitting which is responsible for errors.

Experimental Results

Table 4 shows the results of the above experiments.

In Table 4, the term "cracks" refers to the presence or absence of cracks produced in the process of cold rolling from 5 mm to 1.5 mm described above; the symbol o indicates there were no cracks, and the symbol x indicates that there were such cracks. The term "inclusions" refers to the number of inclusions in 1 field of view by the optical microscope observation at 400x magnification mentioned above. The term "pits" refers to the number of disks in which pits were observed in the examination for pits carried out 60 fields respectively on the various substrates as described above.

TABLE 4

| | Composition No. | Mechanical Properties | | | Cracks | Inclusions | Pits |
|---|---|---|---|---|---|---|---|
| | | Tensile Strength (Kgf/mm$^2$) | Yield Strength Kgf/mm$^2$) | Elongation (%) | | | |
| Example | 1 | 30.5 | 23.5 | 47.5 | o | 0 | 0 |
| | 2 | 31.2 | 24.0 | 45.2 | o | 0 | 0 |
| | 3 | 31.4 | 24.5 | 42.8 | o | 0 | 0 |
| | 4 | 32.6 | 23.5 | 40.8 | o | 0 | 0 |
| | 5 | 33.0 | 27.3 | 46.1 | o | 0 | 0 |
| | 6 | 32.8 | 25.3 | 45.4 | o | 0 | 0 |
| | 7 | 32.3 | 27.6 | 43.2 | o | 0 | 0 |
| | 8 | 33.9 | 28.3 | 42.0 | o | 0 | 0 |
| | 9 | 57.2 | 42.8 | 29.3 | o | 0 | 0 |
| | 10 | 59.8 | 44.5 | 26.0 | o | 0 | 0 |
| Comparative | 11 | 31.8 | 25.6 | 45.7 | o | 0 | 5 |
| | 12 | 32.8 | 24.7 | 43.8 | o | 0 | 7 |

TABLE 4-continued

|  | Composition No. | Mechanical Properties | | | Cracks | Inclusions | Pits |
|---|---|---|---|---|---|---|---|
|  |  | Tensile Strength (Kgf/mm$^2$) | Yield Strength Kgf/mm$^2$ | Elongation (%) |  |  |  |
| Example | 13 | 33.9 | 26.9 | 41.0 | o | 0 | 6 |
| Comparative Example | 14 | 31.7 | 25.0 | 43.7 | o | 0 | 11 |
|  | 15 | 31.6 | 24.2 | 44.4 | o | 0 | 9 |
|  | 16 | 30.5 | 23.8 | 47.5 | o | 0 | 15 |
|  | 17 | 32.6 | 27.6 | 45.7 | o | 8 | 0 |
|  | 18 | 32.3 | 25.8 | 40.0 | o | 8 | 0 |
|  | 19 | 32.0 | 26.5 | 44.8 | o | 3 | 0 |
|  | 20 | 31.7 | 22.9 | 47.0 | o | 4 | 0 |
|  | 21 | 32.2 | 25.9 | 45.4 | o | 6 | 0 |
|  | 22 | 31.9 | 26.0 | 43.3 | o | 7 | 0 |
|  | 23 | 24.2 | 17.9 | 50.3 | o | 0 | 0 |
|  | 24 | 65.3 | 50.1 | 19.3 | x | 0 | 0 |
| Conventional Example | 25 | 27.5 | 12.0 | 22.0 | o | 10$^2$ | 0 |
|  | 26 | 97.2 | 91.5 | 16.7 | x | 0 | 50 |
|  | 27 | 42.9 | 32.5 | 33.8 | o | 0 | 12 |
|  | 28 | 61.4 | 51.6 | 19.7 | x | 0 | 29 |

The following was found from Table 4.

Firstly, in cold-rolled plates manufactured from composition nos. 1–10 within the range of compositions of this invention, and from composition nos. 11–16, 23 and 24 which satisfied the relation EQ 2≦0.015% in the comparative examples and conventional examples, no inclusions were observed; on the other hand, in the case of composition nos. 17–22, which do not satisfy the relation EQ 2≦0.015%, and of AZ alloy composition no. 25 inclusions were observed. FIG. 1 shows the relation between the number of inclusions and the value of EQ 2. From this it is seen that there is a distinct change in the number of inclusions observed at the value EQ 2=0.015%.

Next, for composition nos. 1–10 in the range of this invention and of composition nos. 11–22 which satisfied the relation 0.03% ≦EQ 3≦0.5% in the comparative examples, the yield strength is no less than 20 kgf/mm$^2$, elongation is no less than 20%, and the mechanical strength required of a substrate material is maintained. Further, in these compositions, no cracks are produced in cold rolling, and they have excellent cold workability. On the other hand, composition no. 23 where EQ 3 is less than 0.03% has insufficient strength, and this is an obstacle to making the substrate thin as will be descried later. Further, in composition no. 24 where EQ 3 is greater than 0.5%, it is seen that cracks are produced in the cold rolling process, and cold workability is poor. This composition therefore has an adverse effect during the manufacture of disk blanks.

Further, in compositions 1–10 within the range of this invention, and in composition nos. 17–24 which satisfy the relation EQ 1≦0.010% of the comparative examples, there were no substrates where pitting had occurred. On the other hand, in composition nos. 11–16, 26–28 which do not satisfy the relation EQ 1≦0.010%, many substrates were found with pitting. FIG. 2 shows the relation between the number of substrates with pitting and the value of EQ 1. From this it is seen that there is a distinct change in the number of substrates with pitting at the value EQ 1=0.010%.

EXAMPLE 2

In this example, the possibility of making the substrate thin and its heat resistance were investigated.

For composition nos. 1–10, 23 and 25–28, some disks were polished further so as to manufacture magnetic disk substrates of thickness 0.6 mm. Magnetic disks were then manufactured by forming a Co-Ni system magnetic film by sputtering on the 0.6 mm substrates and on the 1.27 mm substrates described above. Sputtering was carried out by the magnetron sputtering apparatus provided with opposite targets shown in FIG. 3. This apparatus has a pair of opposite targets 2a, 2b in a vacuum chamber (not shown in the figure), and a substrate 1 is arranged on one side between them so as to form a magnetic film. Permanent magnets 4, 5 are installed adjacent to these targets respectively so as to generate a magnetic field 8 between them. When a potential is applied between targets 2a, 2b, negative ions 6 and electrons 7 are projected from target 2a into the space between them, and electrons 7 collide with target 2b so as to knock out negative ions. The negative ions knocked out are deposited on substrate 1 which is charged positively. In FIG. 3, reference numeral 3 is the anode.

Disks wherein a magnetic film had been formed using a sputtering apparatus of the above type, and disks wherein the magnetic film had not yet been formed, were rotated at 3600 rpm, and the displacement in the vertical direction at a point 25 mm from the disk center was measured. For this test, the device shown in FIG. 4 was used. In FIG. 4, reference numeral 11 is the disk, 12 is the rotating axis used to rotate the disk, and 13 is a sensor to detect the displacement of the disk in the vertical direction. This sensor 13 detects the vertical displacement of the disk as a difference of electrostatic capacitance, electrostatic capacitance being measured by an RVA Tester. Table 5 shows the results.

TABLE 5

|  | Composition No. | Plate thickness | Displacement before sputtering | Displacement after sputtering | Possibility of manufacturing thin substrates | Heat resistance |
|---|---|---|---|---|---|---|
| Example | 1 | 1.27 | 3.1 | 3.2 | o | o (0.1) |
|  |  | 0.60 | 3.5 | 3.6 |  | o (0.1) |
|  | 2 | 1.27 | 4.6 | 3.9 | o | o (0.7) |
|  |  | 0.60 | 4.4 | 4.0 |  | o (0.4) |

TABLE 5-continued

| | Composition No. | Plate thickness | Displacement before sputtering | Displacement after sputtering | Possibility of manufacturing thin substrates | Heat resistance |
|---|---|---|---|---|---|---|
| | 3 | 1.27 | 3.8 | 4.2 | o | o (0.4) |
| | | 0.60 | 3.9 | 4.1 | | o (0.2) |
| | 4 | 1.27 | 5.2 | 5.6 | o | o (0.2) |
| | | 0.60 | 4.8 | 4.6 | | o (0.2) |
| | 5 | 1.27 | 5.0 | 4.8 | o | o (0.2) |
| | | 0.60 | 4.9 | 4.8 | | o (0.2) |
| | 6 | 1.27 | 4.1 | 4.1 | o | o (0.0) |
| | | 0.60 | 4.2 | 4.4 | | o (0.2) |
| | 7 | 1.27 | 3.3 | 3.2 | o | o (0.1) |
| | | 0.60 | 3.8 | 3.5 | | o (0.3) |
| Example | 8 | 1.27 | 3.9 | 3.6 | o | o (0.3) |
| | | 0.60 | 3.5 | 3.8 | | o (0.3) |
| | 9 | 1.27 | 3.4 | 3.6 | o | o (0.2) |
| | | 0.60 | 3.5 | 3.6 | | o (0.1) |
| | 10 | 1.27 | 3.2 | 3.0 | o | o (0.2) |
| | | 0.60 | 3.5 | 3.4 | | o (0.1) |
| Comparative Example | 23 | 1.27 | 5.0 | 5.3 | x | o (0.3) |
| | | 0.60 | 12.0 | 12.5 | | o (0.5) |
| Conventional Example | 25 | 1.27 | 2.1 | 4.8 | x | x (2.7) |
| | | 0.60 | 21.3 | ≧50.0 | | x (≧28.7) |
| | 26 | 1.27 | 7.8 | 7.8 | o | o (0.0) |
| | | 0.60 | 8.0 | 8.0 | | o (0.0) |
| | 27 | 1.27 | 3.9 | 4.2 | o | o (0.3) |
| | | 0.60 | 4.2 | 4.4 | | o (0.2) |
| | 28 | 1.27 | 6.5 | 6.5 | o | o (0.0) |
| | | 0.60 | 6.9 | 7.0 | | o (0.1) |

In Table 5, the column which concerns the possibility of making the disk thin, evaluates this possibility in terms of the difference in the displacement of a disk of thickness 1.27 mm and that of a disk of thickness 0.6 mm; the symbol o refers to the case where the thickness can be reduced, and the symbol x to the case where it cannot. The column which concerns the heat resistance of the disk evaluates heat resistance in terms of the difference in its displacement before and after sputtering; the symbol o refers to the case where the heat resistance is satisfactory, and the symbol x to the case where heat resistance is poor.

As seen from Table 5, in composition nos. 1–10 within the range of this invention and composition nos. 26–28 of the conventional examples, no great difference was found in vertical displacement of the disk for different substrate thicknesses, or before and after sputtering. Disks of these compositions may therefore be made thin, and they also have satisfactory heat resistance. This is due to the fact that these compositions consist mainly of titanium. In the case of composition no. 23 of the comparative examples, however, it was found that despite the fact that it also consists mainly of titanium, the substrate has low strength. As a result, there was a large displacement in the vertical direction, and it is therefore difficult to manufacture a disk of this composition in small thickness.

In contrast to these results, composition no. 25 of the conventional examples using aluminum showed a very large difference of vertical displacement depending on substrate thickness, or before and after sputtering. Further, the value of the displacement for a substrate of thickness 0.6 mm and after sputtering, was very high. This confirms that composition no. 25 using aluminum cannot be used to manufacture thin disks, and also that it has poor heat resistance.

EXAMPLE 3

For substrates using compositions 1–10 within the range of this invention, the grain size was varied by changing the conditions of thermal flattening and the relation between grain size and surface properties was investigated. Table 6 shows the results.

TABLE 6

| Composition No. | Thermal flattening conditions | Grain size ($\mu$m) | Surface Properties Ra($\mu$m) |
|---|---|---|---|
| 1 | 500° C. × 6 hr | 21 | 0.02 |
| | 600° C. × 6 hr | 43 | 0.04 |
| | 700° C. × 6 hr | 57 | 0.08 |
| 2 | 500° C. × 6 hr | 26 | 0.02 |
| | 600° C. × 6 hr | 51 | 0.04 |
| | 700° C. × 6 hr | 54 | 0.07 |
| 3 | 500° C. × 6 hr | 25 | 0.02 |
| | 600° C. × 6 hr | 42 | 0.04 |
| | 700° C. × 6 hr | 59 | 0.09 |
| 4 | 500° C. × 6 hr | 23 | 0.01 |
| | 600° C. × 6 hr | 44 | 0.03 |
| | 700° C. × 6 hr | 53 | 0.06 |
| 5 | 500° C. × 6 hr | 24 | 0.02 |
| | 600° C. × 6 hr | 46 | 0.04 |
| | 700° C. × 6 hr | 55 | 0.08 |
| 6 | 500° C. × 6 hr | 26 | 0.02 |
| | 600° C. × 6 hr | 50 | 0.04 |
| | 700° C. × 6 hr | 54 | 0.06 |
| 7 | 500° C. × 6 hr | 22 | 0.01 |
| | 600° C. × 6 hr | 52 | 0.04 |
| | 700° C. × 6 hr | 56 | 0.07 |
| 8 | 500° C. × 6 hr | 21 | 0.01 |
| | 600° C. × 6 hr | 48 | 0.04 |
| | 700° C. × 6 hr | 52 | 0.05 |
| 9 | 500° C. × 6 hr | 25 | 0.01 |
| | 600° C. × 6 hr | 49 | 0.04 |
| | 700° C. × 6 hr | 57 | 0.07 |
| 10 | 500° C. × 6 hr | 23 | 0.01 |
| | 600° C. × 6 hr | 44 | 0.04 |
| | 700° C. × 6 hr | 51 | 0.05 |

In Table 6, in the column concerning surface properties (Ra), a roughness curve as in FIG. 5 is calculated by eliminating low frequency components from the outline curve of the surface obtained when the object to be measured is cut by a flat surface perpendicular to the surface to be measured. The length L of this curve in the direction of the surface is extracted, and the roughness curve is represented by y=f(x) with the center line of the extracted part on the x axis, and the direction of vertical magnification on the y axis. The value of Ra is then given in μm units by the following expression (1):

$$Ra = (1/L) \int_0^L |f(x)| dx \quad (1)$$

Figure 6:
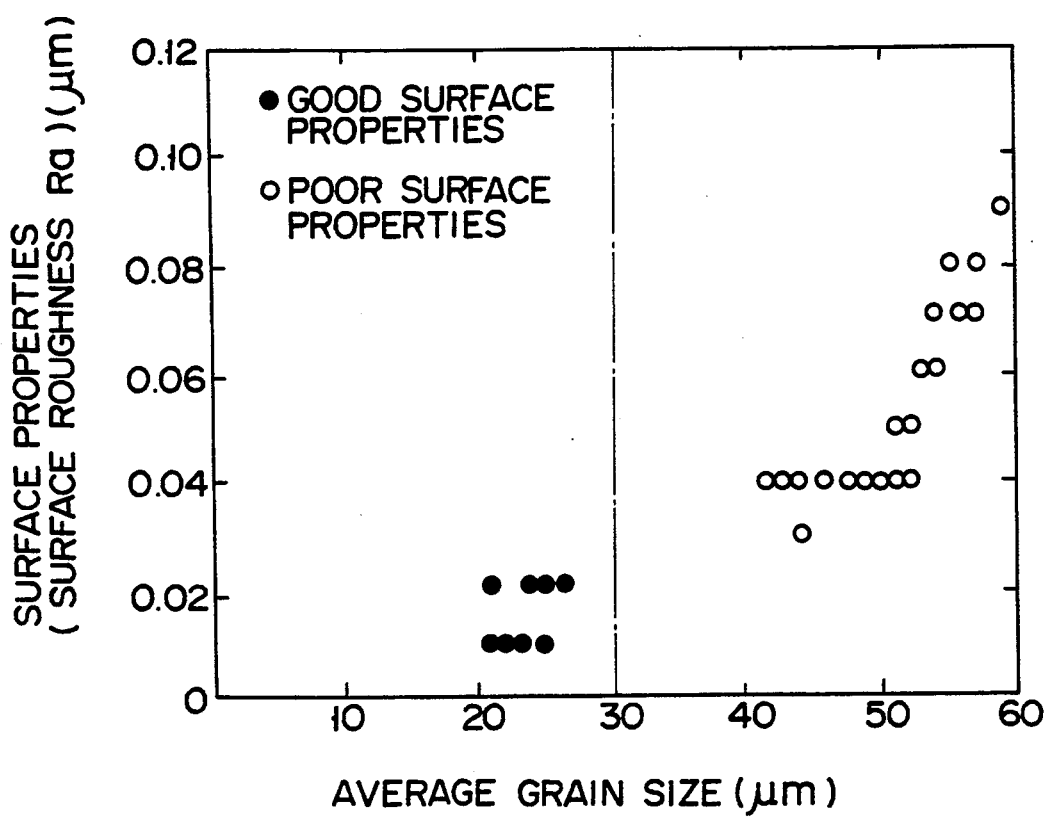
FIG. 6 is a graph showing the relation between the average grain size of the substrate and surface properties.

As shown in Table 6, for each composition, the average grain size increases as the thermal flattening temperature increases between 500° C. and 700° C., and it is seen that surface properties deteriorate as the thermal flattening temperature increases. FIG. 6 shows the relation between these surface properties and average grain size. From FIG. 6, it is seen that there is a distinct change in surface properties when the grain size is 30 μm. When the average grain size is 30 μm or less, Ra does not exceed 0.02 μm which is very satisfactory; on the other hand, when the average grain size is greater than 30 μm, Ra is 0.03 μm or more. If the magnetic head is to run smoothly over the substrate surface, if there are to be few magnetic errors, and if a high recording density is to be obtained, it is desirable that the surface properties of the magnetic disk substrate are such that Ra≦0.02 μm This therefore confirms that the magnetic disk substrate will have even better properties if the average grain size does not exceed 30 μm.

FIGS. 7A and 7B are photographs of a substrate surface at 200x magnification. FIG. 7A is a surface where average grain size is less than 30 μm; FIG. 7B is a surface where average grain size exceeds 30 μm. From these photographs, in FIG. B where the grain size is large, it is seen that there is a clear difference in level between the crystals and that the surface is fairly rough. In FIG. A on the other hand, there is no clear difference in the crystals, and surface properties are very satisfactory.

From the above examples, it was thus established that if the composition of the magnetic disk substrate is within the range of this invention, a magnetic disk substrate with excellent heat resistance, which can be manufactured in small thicknesses, and which is substantially free of inclusions and pits responsible for magnetic errors and deterioration of surface properties, can be obtained. Further, it was also established that by making the average grain size no greater than 30 μm, even better surface properties are obtained.

What is claimed is:

1. A magnetic disk substrate consisting essentially of oxygen, nitrogen, carbon, at least one element selected from the group consisting of V, Fe, Cr, Ni and Co, at least one element selected from the group consisting of a rare earth metal, Si, B and W, and the balance of Ti, said substrate in which V≦0.13 wt %, Fe≦0.20 wt. %, Cr≦0.17 wt %, Ni≦0.31% wt % and Co≦0.23 wt %, satisfying the conditions of:

(a) $0.003 \text{ wt \%} \leq \frac{V \text{ wt \%}}{13} + \frac{Fe \text{ wt \%}}{20} + \frac{Cr \text{ wt \%}}{17} + \frac{Ni \text{ wt \%}}{31} + \frac{Co \text{ wt \%}}{23} \leq 0.01 \text{ wt \%},$ (b) 0.010 wt % ≦ (rare earth metal wt %+Sr wt %+B wt %+W wt %) ≦0.015 wt % and (c) 0.03 wt % ≦ {oxygen wt %+2 (nitrogen wt %)+0.75 (carbon wt %)}≦0.5 wt %.

2. The magnetic disk substrate of claim 1 having a tensile strength of 30 kgf/mm² or more.

3. A magnetic disk substrate according to claim 1 having an average grain size which does not exceed 30 μm.

4. A magnetic disk substrate according to claim 1 having an average grain size which does not exceed 30 μm.

* * * * *